(12) United States Patent
Bernat et al.

(10) Patent No.: US 11,271,994 B2
(45) Date of Patent: Mar. 8, 2022

(54) TECHNOLOGIES FOR PROVIDING SELECTIVE OFFLOAD OF EXECUTION TO THE EDGE

(71) Applicant: Intel Corporation, Santa Clara, CA (US)

(72) Inventors: Francesc Guim Bernat, Baecelona (ES); Ned Smith, Beaverton, OR (US); Thomas Willhalm, Sandhausen (DE); Karthik Kumar, Chandler, AZ (US); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/234,718

(22) Filed: Dec. 28, 2018

(65) Prior Publication Data

US 2019/0141120 A1    May 9, 2019

(51) Int. Cl.

| | | |
|---|---|---|
| *H04L 29/08* | (2006.01) | |
| *H04L 67/1008* | (2022.01) | |
| *H04L 67/1021* | (2022.01) | |
| *H04L 67/10* | (2022.01) | |
| *H04L 67/61* | (2022.01) | |
| *H04L 67/63* | (2022.01) | |
| *H04L 67/00* | (2022.01) | |
| *H04L 67/59* | (2022.01) | |

(52) U.S. Cl.
CPC .......... *H04L 67/1008* (2013.01); *H04L 67/10* (2013.01); *H04L 67/1021* (2013.01); *H04L 67/2861* (2013.01); *H04L 67/322* (2013.01); *H04L 67/327* (2013.01); *H04L 67/34* (2013.01)

(58) Field of Classification Search
CPC . H04L 67/10; H04L 67/1008; H04L 67/1021; H04L 67/2861; H04L 67/322; H04L 67/327; H04L 67/34
See application file for complete search history.

(56) References Cited

U.S. PATENT DOCUMENTS

| | | | | |
|---|---|---|---|---|
| 7,644,188 | B2* | 1/2010 | Vlodavsky | ............... H04L 29/06 709/250 |
| 10,037,231 | B1* | 7/2018 | Jakhetiya | ............... G06F 9/5072 |
| 10,659,526 | B2* | 5/2020 | Khalid | ................... G06F 16/178 |
| 2003/0084435 | A1* | 5/2003 | Messer | .................... G06F 9/505 717/174 |
| 2010/0205137 | A1* | 8/2010 | Barsness | .................. G06F 1/329 706/52 |
| 2013/0047155 | A1* | 2/2013 | Caspole | ................... G06F 9/445 718/1 |

(Continued)

*Primary Examiner* — Joshua Joo
(74) *Attorney, Agent, or Firm* — Hanley, Flight & Zimmerman, LLC

(57) ABSTRACT

Technologies for providing selective offload of execution of an application to the edge include a device that includes circuitry to determine whether a section of an application to be executed by the device is available to be offloaded. Additionally, the circuitry is to determine one or more characteristics of an edge resource available to execute the section. Further, the circuitry is to determine, as a function of the one or more characteristics and a target performance objective associated with the section, whether to offload the section to the edge resource and offload, in response to a determination to offload the section, the section to the edge resource.

30 Claims, 10 Drawing Sheets

(56) References Cited

U.S. PATENT DOCUMENTS

| | | | |
|---|---|---|---|
| 2013/0254258 A1* | 9/2013 | Agarwalla | H04L 67/34 709/202 |
| 2013/0346465 A1* | 12/2013 | Maltz | G06F 9/5072 709/201 |
| 2014/0310709 A1* | 10/2014 | Nirantar | G06F 9/5027 718/1 |
| 2015/0264024 A1* | 9/2015 | Frank | H04L 63/08 726/3 |
| 2015/0356293 A1* | 12/2015 | Biswas | G06F 21/31 726/22 |
| 2017/0061566 A1* | 3/2017 | Min | G06T 1/20 |
| 2017/0353397 A1* | 12/2017 | Che | H04L 67/10 |
| 2019/0245806 A1* | 8/2019 | Hanes | H04L 47/808 |
| 2019/0347342 A1* | 11/2019 | Kameswaran | G06F 16/254 |

* cited by examiner

US 11,271,994 B2

TECHNOLOGIES FOR PROVIDING SELECTIVE OFFLOAD OF EXECUTION TO THE EDGE

BACKGROUND

Typically a compute device may execute an application using resources that are local to the compute device, such as a general purpose processor and/or one or more accelerator devices (e.g., devices capable of executing a set of operations faster than the general purpose processor). In some scenarios, a compute device may encounter a section of an application that should be performed within a certain set of parameters (e.g., the section is particularly sensitive to latency, such as a section that is to make decisions based on real time computer vision data, and should be performed within a particular time period) but is unable to satisfy those parameters due to limitations of the compute device. For example, the compute device might not be equipped with a fast enough general purpose processor or an appropriate accelerator device, or the compute device may not have enough energy stored in its battery to execute the section within the specified time period (e.g., utilizing the accelerator device would deplete the remaining energy in the battery).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
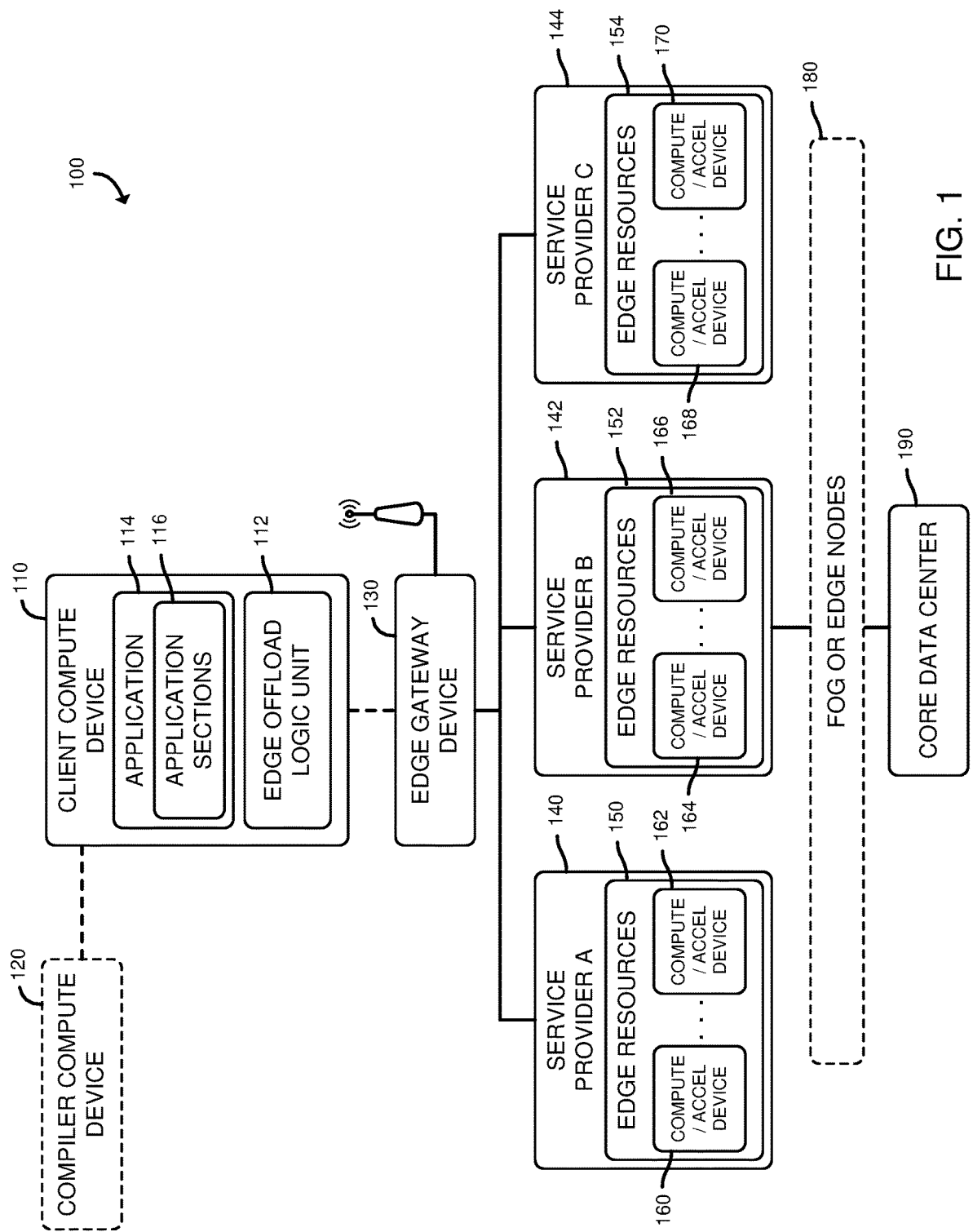
FIG. 1 is a simplified diagram of at least one embodiment of a system for providing selective offload of execution of an application to one or more edge resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require a preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for providing selective offload of execution of an application to one or more edge resources includes a client compute device 110 in communication with an edge gateway device 130. The edge gateway device 130 may be embodied as any device capable of communicating data between the client compute device 110 and one or more edge resources 150, 152, 154 (e.g., resources, such as compute devices and the components thereof, owned and/or operated by one or more service providers, such as cellular network operators) or other compute devices located in a cloud. Further, the edge gateway device 130, in the illustrative embodiment, is configured to receive and respond to requests from the client compute device 110 regarding characteristics of the edge resources 150, 152, 154, such as architectures of processors, accelerator devices, and/or other components in the edge resources 150, 152, 154 (e.g., in compute devices 160, 162, 164, 166, 168, 170), latencies, power usage, and costs (e.g., monetary costs) associated with utilizing those edge resources 150, 152, 154. The edge gateway device 130 and the edge resources 150, 152, 154, in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 180), which may be embodied as a system-level horizontal architecture that distributes resources and services of computing, storage, control and networking anywhere between a core data center 190 (e.g., a data center that is further away from and in a higher level of a hierarchy of the system 100 than the edge resources 150, 152, 154, and that includes multiple compute devices capable of executing one or more services (e.g., processes on behalf of one or more clients)) and an endpoint device (e.g., the client compute device 110).

As discussed in more detail herein, the client compute device 110, in operation, executes an application 114 (e.g., using a processor and/or accelerator device(s)) included in the client compute device 110. The application 114, in the illustrative embodiment, is partitioned into sections 116 (e.g., separate binary files that include object code or other computer executable instructions defining operations to be performed). Further, in the illustrative embodiment, the client compute device 110 includes an edge offload logic unit 112, which may be embodied as any device or circuitry (e.g., a processor, an application specific integrated circuit (ASIC), reconfigurable circuitry, etc.) configured to determine whether a section 116 of an application to be executed by the client compute device 110 is available to be offloaded to one or more of the edge resources 150, 152, 154, determine one or more characteristics of an edge resource 150, 152, 154 (e.g., a latency, a power usage, a cost of usage) available to execute the section 116 (e.g., by sending a request, to the edge gateway device 130, for the characteristics), determine, as a function of the one or more characteristics and a target performance objective associated with the section 116, whether to offload the section 116 to the one or more edge resources 150, 152, 154, and offload, in response to a determination to offload the section 116, the section to one or more of the edge resource(s) 150, 152, 154 (e.g., by sending the section 116 to the edge gateway device 130 for distribution to the corresponding edge resource(s)). As described in more detail herein, the sections 116 of the application 114 are produced, in the illustrative embodiment, by a compiler compute device 120. The compiler compute device 120, in compiling a set of source code for the application 114 to corresponding object code, may identify annotations in the source code indicative of target performance objectives (e.g., prioritize latency, prioritize power usage, prioritize monetary cost) and/or security requirements (e.g., execute the following section in a trusted execution environment) and compile one or more versions of the corresponding section 116 to facilitate meeting the performance objective(s) and/or security requirement(s) (e.g., by compiling the source code for one or more types of accelerator devices, by compiling the source code for a power-efficient processor that has a reduced feature set, by compiling multiple versions of the section that are to be executed in parallel by separate edge resources, etc.).

Figure 2:
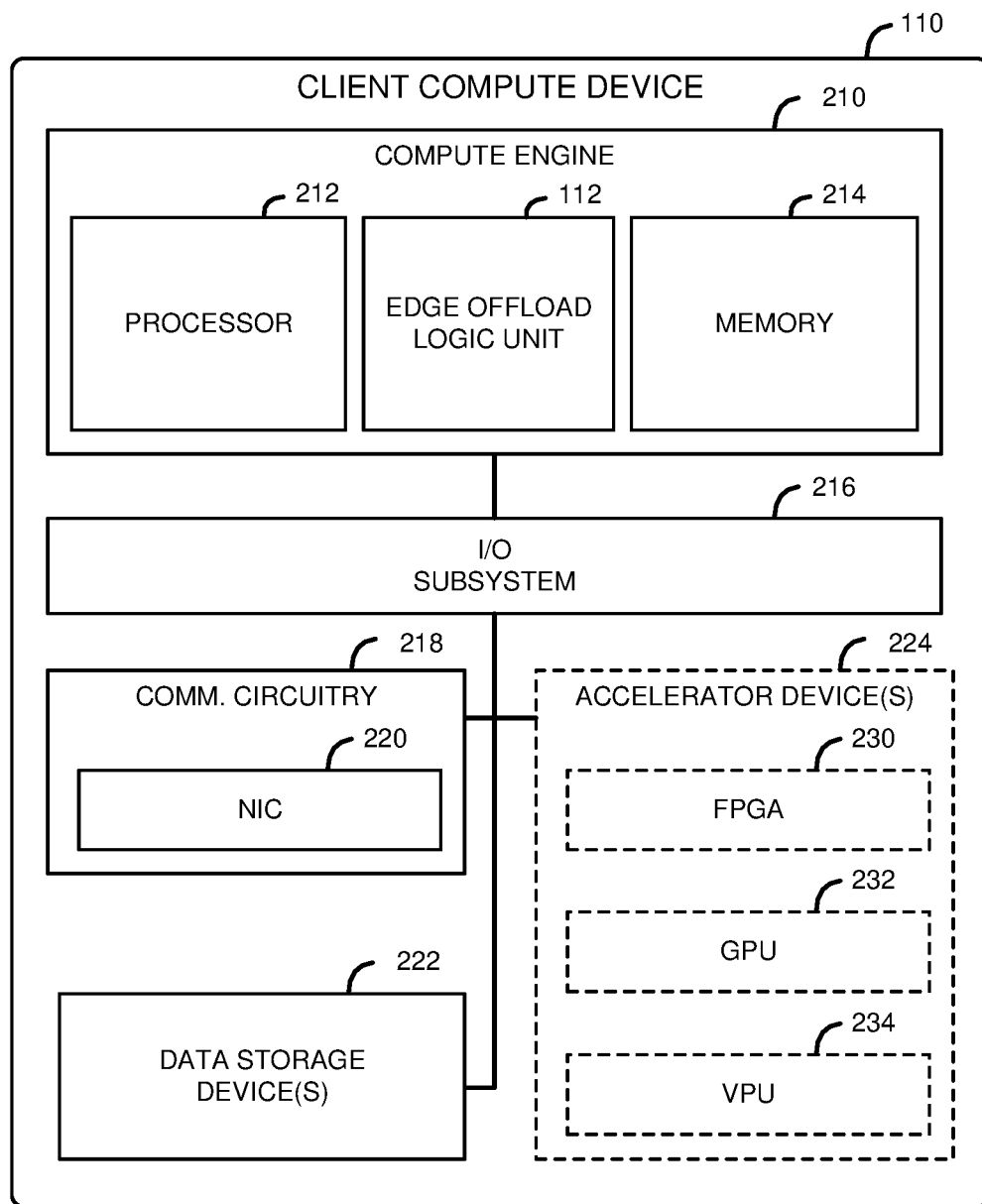
FIG. 2 is a simplified block diagram of at least one embodiment of a client compute device included in the system of FIG. 1.

Referring now to FIG. 2, the illustrative client compute device 110 includes a compute engine (also referred to herein as "compute engine circuitry") 210, an input/output (I/O) subsystem 216, communication circuitry 218, and one or more data storage devices 222. As described herein, the client compute device 110 may also include one or more accelerator devices 224. Of course, in other embodiments, the client compute device 110 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212, a memory 214, and the edge offload logic unit 112, described above with reference to FIG. 1. The processor 212 may be embodied as any type of processor capable of performing the functions described herein (e.g., executing one or more sections of the application 114). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications (the application 114), data operated on by the application(s), libraries, and drivers.

The compute engine 210 is communicatively coupled to other components of the client compute device 110 via the I/O subsystem 216, which may be embodied as circuitry and/or components to facilitate input/output operations with the compute engine 210 (e.g., with the processor 212 and/or the main memory 214) and other components of the client compute device 110. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the client compute device 110, into the compute engine 210.

The communication circuitry 218 may be embodied as any communication circuit, device, or collection thereof, capable of enabling communications over a network between the client compute device 110 and another compute device (e.g., the edge gateway device 130, the edge resources 150, 152, 154, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). The NIC 220 may be embodied as one or more add-in-boards, daughter cards, network interface cards, controller chips, chipsets, or other devices that may be used by the client compute device 110 to connect with another compute device (e.g., the edge gateway device 130, the edge resources 150, 152, 154, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the client compute device 110 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

Each accelerator device(s) 224 may be embodied as any device(s) or circuitries configured to execute a set of operations faster than the processor 212 is capable of executing the operations. The accelerator device(s) 224 may include one or more field programmable gate arrays (FPGAs) 230, each of which may be embodied as a set (e.g., a matrix) of logic gates that can be configured to perform a set of operations according to a defined configuration (e.g., a bit stream). The accelerator device(s) 224 may additionally or alternatively include a graphics processing unit (GPU) 232, which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 224 may include a vision processing unit (VPU) 234, which may be embodied as any device or circuitry (e.g., a programmable logic chip, a processor, etc.) configured to perform operations related to machine vision, machine learning, and artificial intelligence. Additionally or alternatively the accelerator device(s) 224 may include other types of devices, such as one or more application specific integrated circuits (ASICs).

The edge resources 150, 152, 154 (e.g., the compute devices 160, 162, 164, 166, 168, 170), the edge gateway device 130, the fog nodes 180, the core data center 190, and the compiler compute device 120 may have components similar to those described in FIG. 2 with reference to the client compute device 110. The description of those components of the client compute device 110 is equally applicable to the description of components of the edge resources 150, 152, 154 (e.g., the compute devices 160, 162, 164, 166, 168, 170), the edge gateway device 130, the fog nodes 180, the core data center 190, and the compiler compute device 120, with the exception that, in some embodiments, the edge offload logic unit 112 is not included in devices other than the client compute device 110. Further, it should be appreciated that any of the edge resources 150, 152, 154 (e.g., the compute devices 160, 162, 164, 166, 168, 170), the edge gateway device 130, the fog nodes 180, the core data center 190, and the compiler compute device 120 may include other components, sub-components, and devices commonly found in a computing device, which are not discussed above in reference to the client compute device 110 and not discussed herein for clarity of the description. Further, it should be understood that one or more components of a compute device may be distributed across any distance, and are not necessarily housed in the same physical unit.

The client compute device 110, edge resources 150, 152, 154 (e.g., the compute devices 160, 162, 164, 166, 168, 170), the edge gateway device 130, the fog nodes 180, the core data center 190, and the compiler compute device 120 are illustratively in communication via a network, which may be embodied as any type of wired or wireless communication network, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
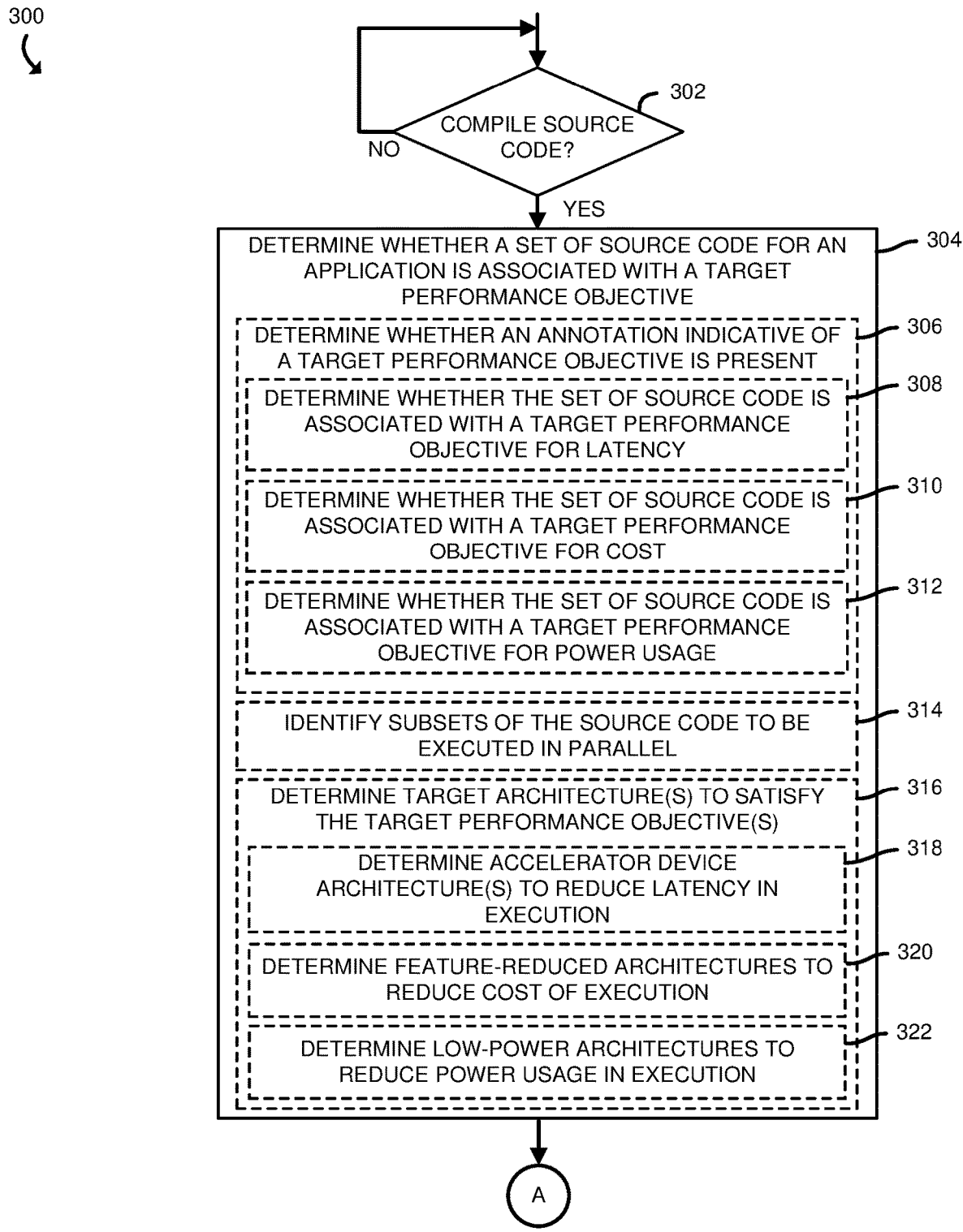
FIGS. 3-4 are a simplified block diagram of at least one embodiment of a method that may be performed by a compiler compute device of FIG. 1 for compiling source code for an application that may be selectively offloaded to one or more edge resource(s)

Referring now to FIG. 3, the compiler compute device 120, in operation, may execute a method 300 for compiling source code for an application (e.g., the application 114) that may be selectively offloaded (e.g., from the client compute device 110) to one or more edge resource(s) (e.g., one or more of the edge resources 150, 152, 154). The method 300 begins with block 302, in which the compiler compute device 120 determines whether to compile source code. The compiler compute device 120 may determine to compile source code in response to a request to do so from a user of the compiler compute device 120 or from another source (e.g., another compute device) and/or based on other factors. Regardless, in response to a determination to compile source code, the method 300 advances to block 304, in which the compiler compute device 120 determines whether a set of source code (e.g., a portion of the source code to be compiled) for an application (e.g., the application 114) is associated with a target performance objective (e.g., a goal to be satisfied in the execution of that portion of the application). In doing so, in the illustrative embodiment, the compiler compute device 120 determines whether an annotation indicative of a target performance objective is present in the set of the source code, as indicated in block 306. The annotation may be any data (e.g., a language construct, such as a pragma or directive, a keyword, a predefined character sequence followed by instructions, etc.), that specifies to a compiler how the associated source code is to be processed.

As indicated in block 308, in determining whether an annotation indicative of a target performance objective is present, the compiler compute device 120 may determine whether the set of source code is associated with a target performance objective for latency (e.g., the annotation indicates to prioritize reducing the latency with which the operations are performed). Additionally or alternatively, the compiler compute device 120 may determine whether the set of source code is associated with a target performance objective for cost (e.g., the annotation indicates to prioritize reducing the monetary cost of performing the operations), as indicated in block 310. Additionally or alternatively, the compiler compute device 120 may determine whether the set of source code is associated with a target performance objective for power usage (e.g., the annotation indicates to prioritize reducing the amount of power used to perform the operations), as indicated in block 312. A target performance objective to prioritize a particular aspect of the performance of the operations, in the illustrative embodiment, means to satisfy that objective to a greater degree than would be possible if the operations were performed on an alternative device. For example, prioritizing latency would mean performing the operations on the device capable of performing the operations the fastest out of a set of available devices. In some embodiments, multiple performance objectives may be indicated and may be prioritized relative to each other and/or may define one or more thresholds to be satisfied (e.g., prioritize reducing latency, but do not exceed a specified power usage). As indicated in block 314, the compiler compute device 120 may identify subsets of the source code to be executed in parallel (e.g., to reduce latency).

Additionally, as indicated in block 316, the compiler compute device 120 determines target architecture(s) to satisfy the target performance objective(s) from block 306. As indicated in block 318, the compiler compute device 120 may determine accelerator device architecture(s) (e.g., GPU, VPU, FPGA, etc.) to reduce the latency in the execution of the operations defined in the annotated set of source code. For example, if the operations are primarily matrix multiply and accumulate operations, the compiler compute device 120 may determine that a GPU is a target architecture for performing the operations. If, on the other hand, the operations are primarily machine-learning or other artificial intelligence related operations, the compiler compute device 120 may determine that a VPU is a target architecture. Additionally or alternatively, the compiler compute device 120 may determine that a target architecture is an FPGA or other accelerator device. As indicated in block 320, the compiler compute device 120 may determine that a feature-reduced architecture (e.g., a device, such as a processor, having fewer hardware features than other processors that may be available in a system) is a target architecture to satisfy a target performance objective for prioritizing reduced monetary cost in executing the operations. Similarly, as indicated in block 322, the compiler compute device 120 may determine that the architecture of a device known to have relatively low power consumption is a target architecture for a set of operations associated with a target performance objective of reducing power consumption. The architectures and properties of those architectures (e.g., average speed, such as instructions per second, average power consumption, such as Watts, and average monetary cost, such as a typical amount of money charged by a service provider to utilize the device over a defined time period) may be defined in a table or other data structure available to the compiler compute device 120 (e.g., in a data storage device 222) to facilitate the determination of the target architecture(s). The compiler compute device 120, in the illustrative embodiment, performs the operations described with reference to block 304 for every set (e.g., portion) of the source code that has a corresponding target performance objective. Subsequently, the method 300 advances to block 324 of FIG. 4, in which the compiler compute device 120 compiles the source code.

Figure 4:
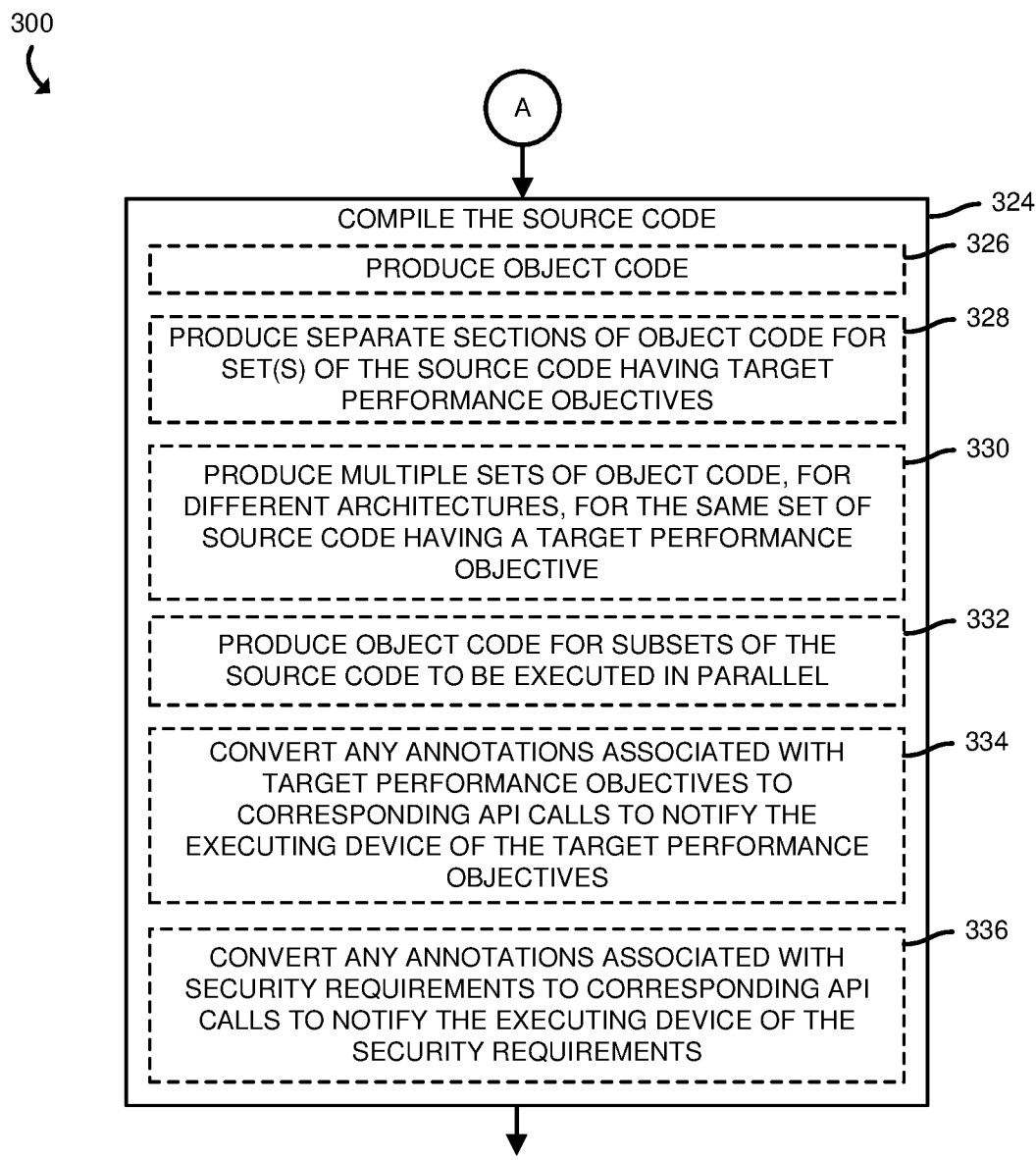

Referring now to FIG. 4, in compiling the source code, in the illustrative embodiment, the compiler compute device 120 produces object code (e.g., a sequence of statements or instructions in a computer language, such as a machine code language (i.e., binary) or an intermediate language such as register transfer language (RTL)), as indicated in block 326. As indicated in block 328, the compiler compute device 120, in the illustrative embodiment, produces one or more separate sections (e.g., binary files) of object code for each set of the source code that has a corresponding set (e.g., one or more) of target performance metrics. Further, as indicated in block 330, the compiler compute device 120 may produce multiple sets of object code (e.g., one for each of multiple architectures) for the same set of source code having a target performance objective. For example, a set (e.g., a portion) of the source code may have an annotation indicating that the set of the source code is to be executed with low latency. As such, the compiler compute device 120 may produce a section of object code with an instruction set usable by a GPU, another section of object code with an instruction set usable by a general purpose processor, and another section of object code defining a configuration of gates for an FPGA (e.g., a bit stream). As indicated in block 332, in some embodiments, the compiler compute device 120 may produce object code for subsets of the set of source code that may be executed in parallel (e.g., object code for one subset of the set of source code may be executed by one device and object code for another subset of the set of source code may be concurrently executed by another device in order to decrease latency). The compiler compute device 120 may additionally convert any annotations associated with target performance objectives to corresponding application programming interface (API) calls to notify the executing device of the target performance objective (e.g., to notify the client compute device 110 that the section of the application has a target performance objective of reducing latency), as indicated in block 334. Similarly, the compiler compute device 120 may convert any annotations associated with security requirements (e.g., an annotation indicating that the section should be executed in a trusted execution environment (TEE), that the section may only be executed by one of an identified set of parties, that the section may not be executed within a defined set of geographic regions, etc.) to corresponding API calls to notify the executing device of the security requirements, as indicated in block 336.

Figure 5:
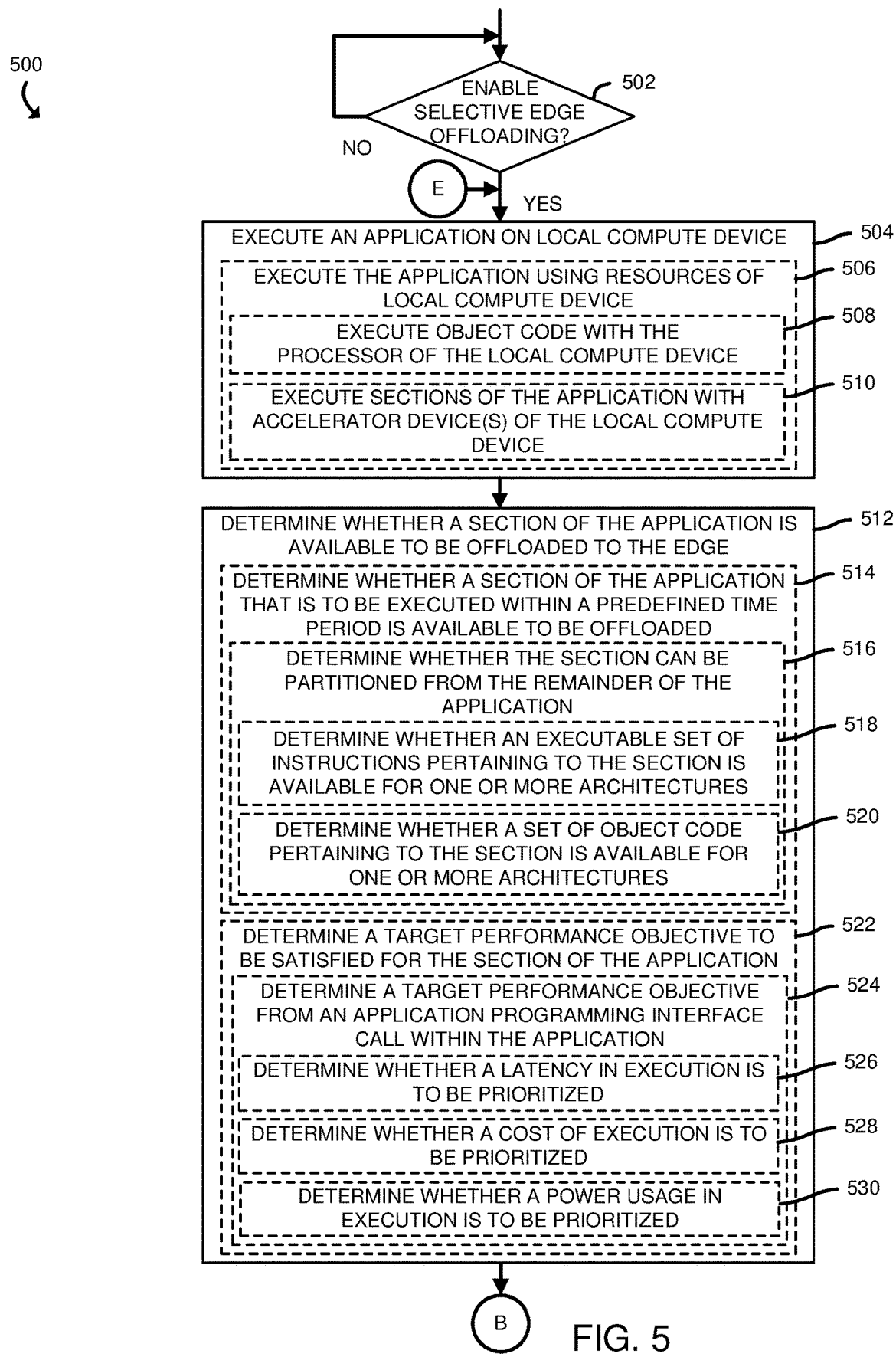
FIG. 5-9 are a simplified block diagram of at least one embodiment of a method for selectively offloading execution of an application to edge resource(s) that may be performed by a client compute device of FIG. 1.

Referring now to FIG. 5, the client compute device 110, in operation, may execute a method 500 for selectively offloading execution of the application 114 (e.g., sections 116 of the application 114) to the edge (e.g., one or more of the edge resources 150, 152, 154). The method 500 begins with block 502 in which the client compute device 110, in the illustrative embodiment, determines whether to enable selective edge offloading (e.g., offloading of sections 116 of the application 114 to one or more of the edge resources 150, 152, 154). In the illustrative embodiment, the client compute device 110 may determine to enable selective edge offloading if the client compute device 110 has been requested to execute an application (e.g., the application 114) and is equipped with the edge offload logic unit 112. In other embodiments, the client compute device 110 may make the determination based on other factors. Regardless, in response to a determination to enable selective edge offloading, the method 500 advances to block 504, in which the client compute device 110 executes an application (e.g., the application 114) on the local compute device (e.g., on the client compute device 110). In doing so, and as indicated in block 506, the client compute device 110 executes the application 114 using the resource of the local compute device (e.g., using the resources of the client compute device 110). For example, the client compute device 110 may execute object code with the processor 212, as indicated in block 508. Additionally or alternatively, the client compute device 110 may execute one or more sections 116 of the application 114 with one or more accelerator devices 224 present in the client compute device 110, as indicated in block 510.

As indicated in block 512, the client compute device 110 determines whether a section 116 of the application is available to be offloaded to the edge (e.g., to one or more of the edge resources 150, 152, 154). In making the determination, in the illustrative embodiment, the client compute device 110 determines whether a section 116 of the application 114 that is to be executed within a predefined time period (e.g., the section is to be executed presently or will be executed as the next section, after a preceding section is executed, etc.) is available to be offloaded, as indicated in block 514. In doing so, the client compute device 110 determines whether the section 116 can be partitioned (e.g., is in a separate binary file) from the remainder of the application 114 (e.g., other sections 116 of the application 114 are encoded in one or more other binary files), as indicated in block 516. As indicated in block 518, in determining whether the section 116 can be partitioned, the client compute device 110 determines whether an executable set of instructions pertaining to the section 116 is available for one or more architectures. More specifically, and as indicated in block 520, the client compute device 110 may determine whether a set of object code pertaining to the section 116 (e.g., as a binary file of object code) is available for one or more architectures. Additionally, in block 522, the client compute device 110 determines a target performance objective to be satisfied for the section 116 of the application 114. For example, and as indicated in block 524, the client compute device 110 may determine a target performance objective from an API call within the application 114 (e.g., an API call from block 334 of FIG. 4). In doing so, the client compute device 110 may determine whether a latency in execution is to be prioritized (e.g., whether to prioritize reducing latency), as indicated in block 526. As indicated in block 528, the client compute device 110 may determine whether a cost (e.g., a monetary cost) of execution is to be prioritized. Additionally or alternatively, the client compute device 110 may determine whether a power usage in execution of that section 116 is to be prioritized (e.g., to prioritize reducing the power consumed in executing that section 116 of the application 114), as indicated in block 530. Subsequently, the method 500 advances to block 532 of FIG. 6 in which the client compute device 110 determines the available edge resources (e.g., the edge resources 150, 152, 154 that may be available to execute the section 116).

Figure 6:
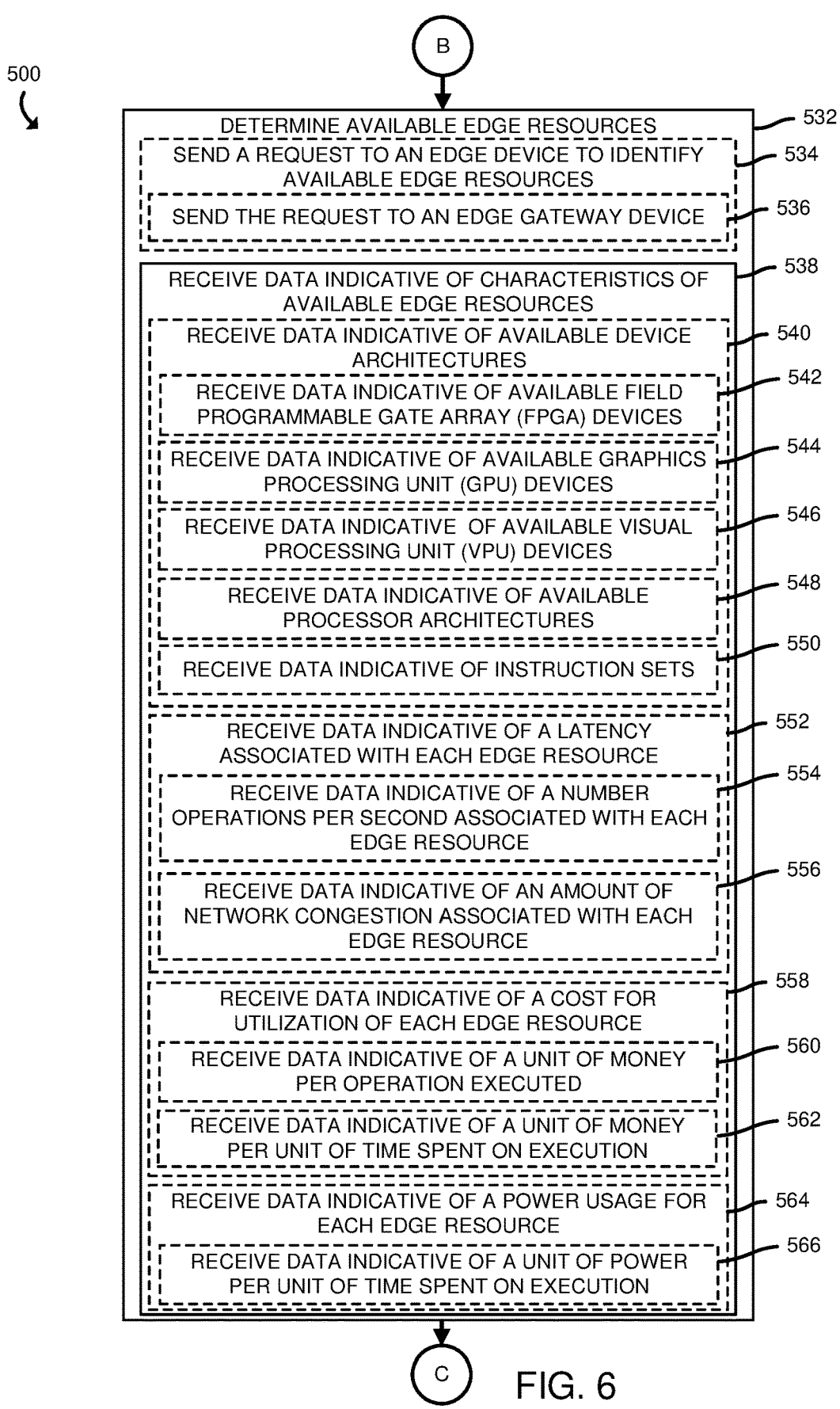

Referring now to FIG. 6, in determining the available edge resources, the client compute device 110, in the illustrative embodiment, sends a request to an edge device to identify available edge resources, as indicated in block 534. In the illustrative embodiment, the client compute device 110 sends the request to an edge gateway device (e.g., the edge gateway device 130), as indicated in block 536. As indicated in block 538, the client compute device 110 receives data indicative of characteristics (e.g., properties) of the available edge resources. In doing so, the client compute device 110 may receive data indicative of available device architectures, as indicated in block 540. For example, the client compute device 110 may receive data indicative of available field programmable gate array (FPGA) devices, as indicated in block 542. The client compute device 110 may also receive data indicative of available graphics processing unit (GPU) devices, as indicated in block 544. Further, the client compute device 110 may receive data indicative of available visual processing units (VPU) devices, as indicated in block 546. The client compute device 110 may additionally or alternatively receive data indicative of neuromorphic compute engines, neural network compute accelerator devices, and/or other accelerator devices capable of accelerating artificial intelligence operations. The client compute device 110 may also receive data indicative of available processor architectures (e.g., processors with hardware support for encryption, compression, or other extended feature sets, processors designed for low power consumption and/or low cost, with reduced feature sets, etc.), as indicated in block 548. Additionally, the client compute device 110 may receive data indicative of instruction sets supported by the available devices (e.g., x86 instruction sets, reduced instruction sets (RISC), etc.), as indicated in block 550. The client compute device 110 may also check for security co-processor availability such as Intel Quick Assist technology (QAT), Intel Security and Manageability Engine (CSME), Trusted Platform Module (TPM) and the like. In some embodiments, in the check for architectures, the client compute device 110 may determine whether security modes are supported such as virtualization, SGX, ARM TrustZone, and the like.

As indicated in block 552, the client compute device 110 may receive data indicative of a latency associated with each edge resource. For example, and as indicated in block 554, the client compute device 110 may receive data indicative of a number of operations per second associated with (e.g., capable of being performed by) each edge resource (e.g., each device available in the edge resources 150, 152, 154, such as FPGAs, GPUs, VPUs, processors, etc.). The client compute device 110 may also receive data indicative of network congestion or other network-related latency associated with each edge resource 150, 152, 154, as indicated in block 556. As indicated in block 558, the client compute device 110 may receive data indicative of a cost for utilization of each edge resource 150, 152, 154 (e.g., each device available in the edge resources 150, 152, 154, such as FPGAs, GPUs, VPUs, processors, etc.). In doing so, the client compute device 110 may receive data indicative of a unit of money (e.g., fraction of a dollar) per operation executed, as indicated in block 560 or data indicative of a unit of money (e.g., fraction of a dollar) per unit of time (e.g., per second) spent on execution, as indicated in block 562. Similarly, the client compute device 110 may receive data indicative of a power usage for each edge resource 150, 152, 154 (e.g., each device available in the edge resources 150, 152, 154, such as FPGAs, GPUs, VPUs, processors, etc.), as indicated in block 564. In doing so, the client compute device 110 may receive data indicative of a unit of power (e.g., Watts) per unit of time (e.g., per second) spent on execution, as indicated in block 566. The client compute device 110 may also receive data indicative of a resiliency (e.g., the ability to recover from a failure) or a reliability (e.g., the ability to avoid a failure) of each edge resource. Subsequently, the method 500 advances to block 568 of FIG. 7, in which the client compute device 110 determines, as a function of the characteristics of the available edge resources (e.g., from block 538 of FIG. 6), whether a target performance objective would be satisfied by offloading execution of the corresponding section 116 of the application 114 to one or more of the available edge resources 150, 152, 154 (e.g., one or more of the devices available in the edge resources 150, 152, 154, such as FPGAs, GPUs, VPUs, processors, etc.).

Figure 7:
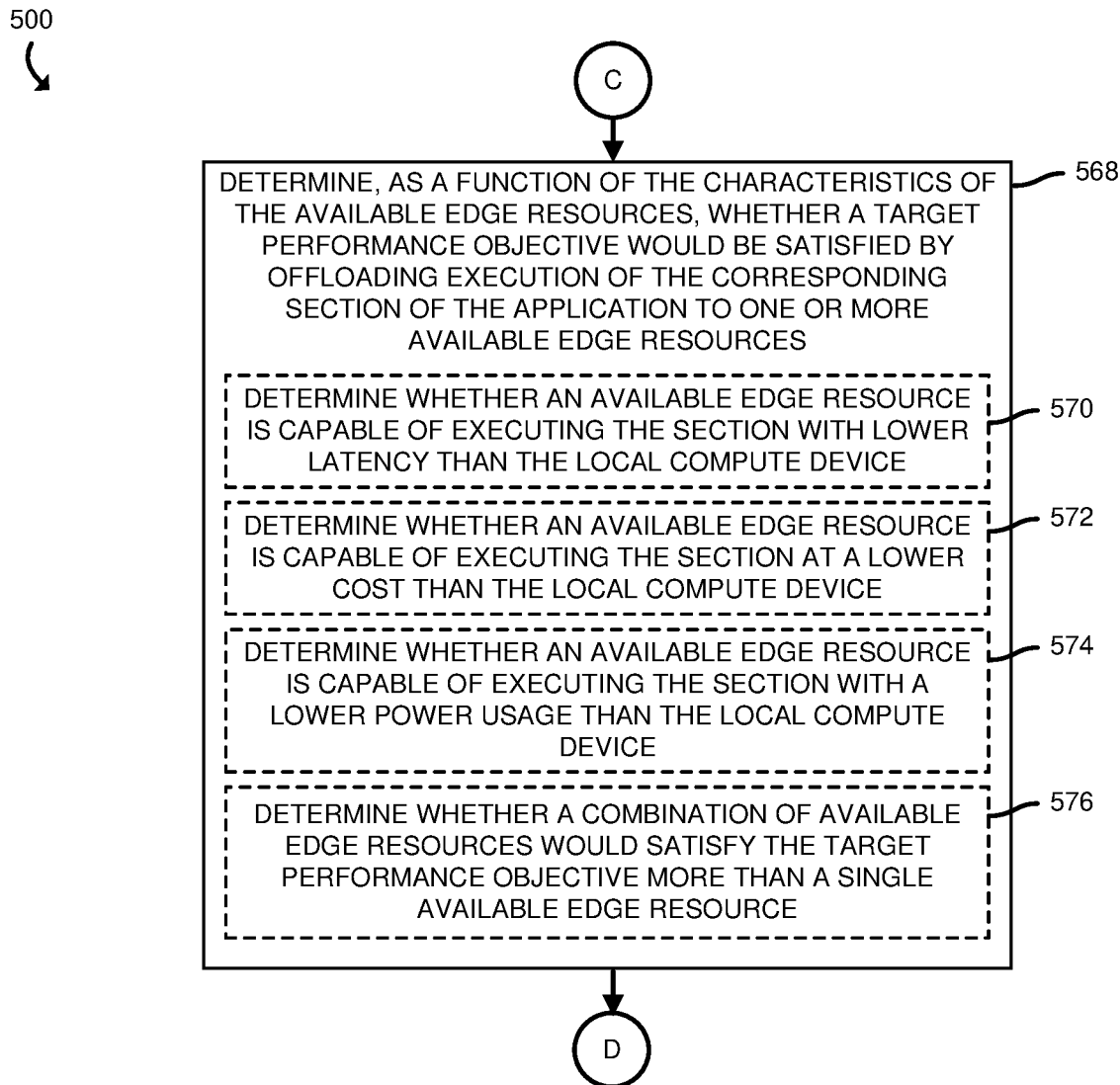

Referring now to FIG. 7, in determining whether a target performance objective would be satisfied by offloading execution to the edge, the client compute device 110 may determine whether an available edge resource 150, 152, 154 is capable of executing the section 116 with lower latency than the local compute device (e.g., the client compute device 110), as indicated in block 570. For example, the client compute device 110 may compare the latency data obtained in block 552 to latency data for the client compute device 110 (e.g., an average number of operations per second, etc.) to determine whether any of the edge resources 150, 152, 154 is capable of executing the section 116 faster. Similarly, the client compute device 110 may determine whether an available edge resource 150, 152, 154 is capable of executing the section 116 at a lower cost than the client compute device 110, as indicated in block 572. Additionally or alternatively, the client compute device 110 may determine whether an available edge resource 150, 152, 154 is capable of executing the section 116 with a lower power usage than the client compute device 110 (e.g., by comparing the power usage data from block 564 to power usage data pertaining to the client compute device 110), as indicated in block 574. As indicated in block 576, the client compute device 110 may determine whether a combination of available edge resources 150, 152, 154 would satisfy the target performance object more (e.g., to a greater degree) than a single available edge resource (e.g., if executing the section 116 in parallel on multiple devices in the edge resources 150, 152, 154 would provide lower latency than executing the section 116 on a single device). Subsequently, the method 500 advances to block 578 of FIG. 8, in which the client compute device 110 determines whether the available edge resources 150, 152, 154 (e.g., any edge resources that would result in satisfying the target performance objective(s)) satisfy any security requirements of the section 116 of the application 114.

Figure 8:
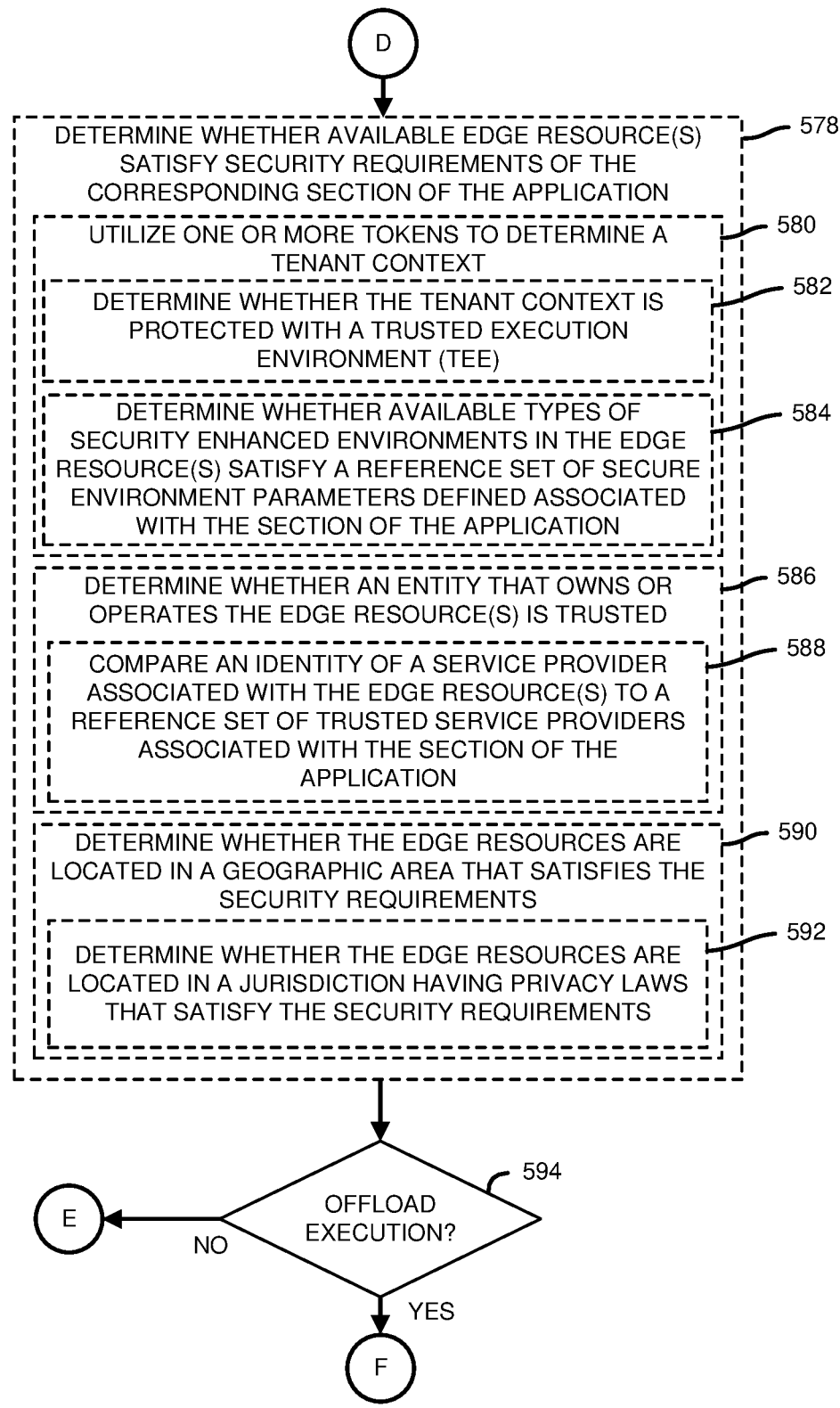

Referring now to FIG. 8, in determining whether the available edge resources 150, 152, 154 that satisfy the target performance objective also satisfy the security requirements, the client compute device 110 may utilize one or more tokens to determine a tenant context (e.g., an environment in which the section 116 of the application 114 would be executed), as indicated in block 580. In doing so, the client compute device 110 may determine whether the tenant context is protected with a trusted execution environment (TEE), as indicated in block 582. As indicated in block 584, the client compute device 110 may determine whether an available type of security enhanced environment in the edge resources satisfies a set of secure environment parameters (e.g., require hardware-based memory encryption, require the ability to allocate private regions of memory as enclaves, etc.) defined in association with the section 116 of the application 114 (e.g., in an API call from block 336). In the illustrative embodiment, and as indicated in block 586, the client compute device 110 may determine whether an entity that owns or operates the edge resource 150, 152, 154 (e.g., a service provider 140, 142, 144) is trusted. In doing so, and as indicated in block 588, the client compute device 110 may compare an identity of a service provider associated with the edge resources 150, 152, 154 to a reference set of trusted service providers associated with the section 116 of the application 114 (e.g., as a set of trusted service providers defined in an API call added to the section 116 during compilation, in block 336). The determination may involve obtaining and verifying an attestation message(s) from the intended offload environment that supplies verifiable evidence that the environment possesses security hardening and quality properties and that those properties are aligned with the reference set of secure environment parameters. As indicated in block 590, the client compute device 110 may determine whether the edge resources 150, 152, 154 are located in a geographic area that satisfies security requirements for the section 116. For example, and as indicated in block 592, the client compute device 110 may determine whether the edge resources 150, 152, 154 are located in a jurisdiction having privacy laws that satisfy the security requirements (e.g., a requirement to utilize a particular level of encryption, a requirement to delete tenant data after use, etc.). Subsequently, in block 594, the client compute device 110 determines the subsequent course of action based on whether the client compute device 110 has determined whether to offload execution of the section 116 to one or more of the edge resources 150, 152, 154 (e.g., whether the target performance metric(s) would be satisfied and whether any security requirements would be satisfied by offloading execution). If not, the method loops back to block 504, in which the client compute device 110 continues executing the application 114 locally. Otherwise, the method 500 advances to block 596 of FIG. 9, in which the client compute device 110 offloads the section 116 of the application 114 to one or more target edge resources 150, 152, 154 for execution.

Figure 9:
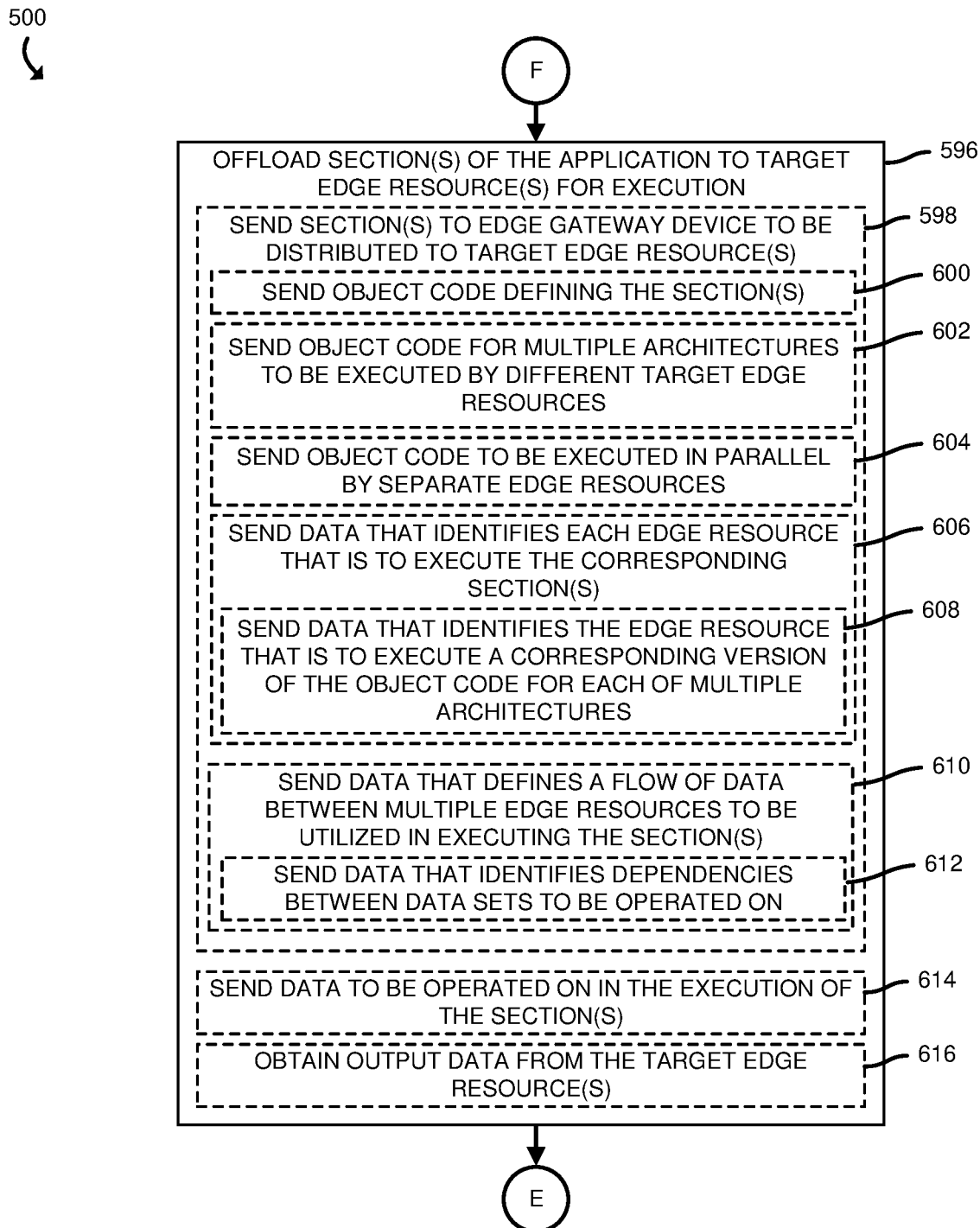

Referring now to FIG. 9, in offloading the section 116, the client compute device 110, in the illustrative embodiment, sends the section 116 (e.g., a binary file) to the edge gateway device 130 to be distributed to one or more target edge resources 150, 152, 154 (e.g., target edge resource(s) that would satisfy the target performance objective(s) and any security requirement(s) for the section 116), as indicated in block 598. In doing so, and as indicated in block 600, the client compute device 110 sends object code defining the section 116. As indicated in block 602, the client compute device 110 may send object code for multiple architectures to enable the section 116 to be executed by different target edge resources (e.g., by an FPGA and by a GPU). The client compute device 110 may send the object code to be executed in parallel by separate edge resources, as indicated in block 604. As indicated in block 606, the client compute device 110 may send data that identifies each edge resource that is to execute the section 116. Further, and as indicated in block 608, the client compute device 110 may send data that identifies the edge resource that is to execute a corresponding version of the object code for each of multiple different architectures (e.g., data that indicates that a bit stream defining the section is to be executed by a particular FPGA and that a set of object code defining a sequence of instructions for a particular instruction set is to be executed by a particular GPU). As indicated in block 610, the client compute device 110 may send data that defines a flow of data between multiple edge resources to be utilized in execution the section 116. For example, and as indicated in block 612, the client compute device 110 may send data indicative of dependencies between data sets to be operated on (e.g., data set A is to be operated on by an FPGA and data set B is to be concurrently operated on by a GPU, and a resulting data set C is to be produced by combining data sets A and B, and should subsequently be provided to a processor to be operated on). As indicated in block 614, the client compute device 110 may send data to be operated on during the execution of the section 116 (e.g., image data, sensor data, etc.). Further, the client compute device 110 obtains output data from the target edge resources (e.g., the resulting data produced by executing the section 116 on the input data), as indicated in block 616. Subsequently, the method 500 loops back to block 502 to continue executing the application 114 on the client compute device 110.

Figure 10:
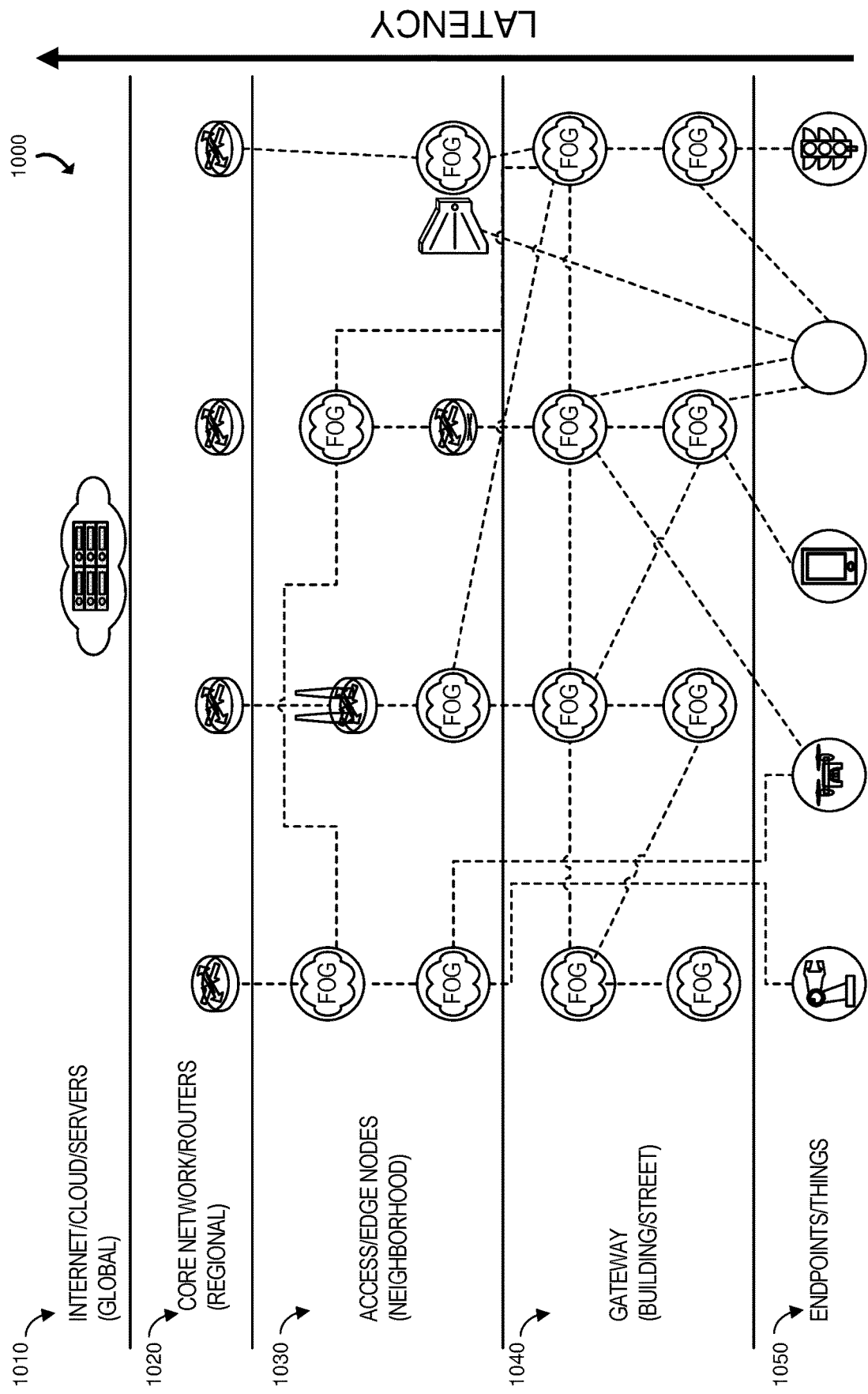
FIG. 10 is a simplified block diagram of a fog and mobile edge computing (MEC) network topology that may be utilized with the system of FIG. 1.

Referring briefly to FIG. 10, a MEC and fog network topology 1000 is shown. The network topology 1000 includes endpoints (at an endpoints/things network layer 1050), gateways (at a gateway layer 1040), access or edge computing nodes (e.g., at neighborhood nodes layer 1030), core network or routers (e.g., at a regional or central office layer 1020). A fog network (e.g., established at the gateway layer 1040) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 10 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead.

EXAMPLES

Illustrative examples of the technologies disclosed herein are provided below. An embodiment of the technologies may include any one or more, and any combination of, the examples described below.

Example 1 includes a device comprising circuitry to determine whether a section of an application to be executed by the device is available to be offloaded; determine one or more characteristics of an edge resource available to execute the section; determine, as a function of the one or more characteristics and a target performance objective associated with the section, whether to offload the section to the edge resource; and offload, in response to a determination to offload the section, the section to the edge resource.

Example 2 includes the subject matter of Example 1, and wherein to determine whether a section of the application is available to be offloaded comprises to determine whether the section is partitioned from a remainder of the application as a separate set of object code.

Example 3 includes the subject matter of any of Examples 1 and 2, and wherein to determine whether a section of the application is available to be offloaded comprises to determine whether the section is associated with a target performance objective to prioritize latency in execution, a target performance objective to prioritize a monetary cost of execution, or a target performance objective to prioritize power usage in execution of the section.

Example 4 includes the subject matter of any of Examples 1-3, and wherein the circuitry is further to send a request to an edge gateway device to determine one or more edge resources available to execute the section of the application.

Example 5 includes the subject matter of any of Examples 1-4, and wherein the circuitry is further to receive data indicative of an architecture of each edge resource.

Example 6 includes the subject matter of any of Examples 1-5, and wherein to receive data indicative of an architecture of each edge resource comprises to receive data indicative of one or more available field programmable gate array (FPGA) devices, one or more available graphics processing unit (GPU) devices, one or more available visual processing unit (VPU) devices, or one or more available application specific integrated circuits (ASICs).

Example 7 includes the subject matter of any of Examples 1-6, and wherein to receive data indicative of an architecture of each edge resource comprises to receive data indicative of an instruction set supported by each edge resource.

Example 8 includes the subject matter of any of Examples 1-7, and wherein the circuitry is further to receive data indicative of a latency associated with the edge resource, data indicative of a cost of utilization of the edge resource, data indicative of a power usage of the edge resource, data indicative of a resiliency of the edge resource, or data indicative of a reliability of the edge resource.

Example 9 includes the subject matter of any of Examples 1-8, and wherein to determine whether to offload the section to the edge resource comprises to determine whether the edge resource is capable of executing the section with lower latency than the device.

Example 10 includes the subject matter of any of Examples 1-9, and wherein to determine whether to offload the section to the edge resource comprises to determine whether the edge resource is capable of executing the section at a lower cost than the device.

Example 11 includes the subject matter of any of Examples 1-10, and wherein to determine whether to offload the section to the edge resource comprises to determine whether the edge resource is capable of executing the section with a lower power usage than the device.

Example 12 includes the subject matter of any of Examples 1-11, and wherein the edge resource is one of multiple edge resources and wherein to offload the section to the edge resource comprises to send object code defining the section to be executed in parallel by the multiple edge resources.

Example 13 includes the subject matter of any of Examples 1-12, and wherein to determine whether to offload the section to the edge resource comprises to determine whether the edge resource satisfies a security requirement associated with the section.

Example 14 includes the subject matter of any of Examples 1-13, and wherein to determine whether the edge resource satisfies a security requirement associated with the section comprises to determine whether the edge resource is capable of executing the section in a trusted execution environment.

Example 15 includes the subject matter of any of Examples 1-14, and wherein to determine whether to edge resource satisfies a security requirement associated with the section comprises to determine whether the edge resource is located in a geographic area that satisfies the security requirement.

Example 16 includes a method comprising determining, by a device, whether a section of an application to be executed by the device is available to be offloaded; determining, by the device, one or more characteristics of an edge resource available to execute the section; determining, by the device and as a function of the one or more characteristics and a target performance objective associated with the section, whether to offload the section to the edge resource; and offloading, by the device and in response to a determination to offload the section, the section to the edge resource.

Example 17 includes the subject matter of Example 16, and wherein determining whether a section of the application is available to be offloaded comprises determining whether the section is partitioned from a remainder of the application as a separate set of object code.

Example 18 includes the subject matter of any of Examples 16 and 17, and wherein determining whether a section of the application is available to be offloaded comprises determining whether the section is associated with a target performance objective to prioritize latency in execution, a target performance objective to prioritize a monetary cost of execution, or a target performance objective to prioritize power usage in execution of the section.

Example 19 includes the subject matter of any of Examples 16-18, and further including sending, by the device, a request to an edge gateway device to determine one or more edge resources available to execute the section of the application.

Example 20 includes one or more machine-readable storage media comprising a plurality of instructions stored thereon that, in response to being executed, cause a device to determine whether a section of an application to be executed by the device is available to be offloaded; determine one or more characteristics of an edge resource available to execute the section; determine, as a function of the one or more characteristics and a target performance objective associated with the section, whether to offload the section to the edge resource; and offload, in response to a determination to offload the section, the section to the edge resource.

Example 21 includes one or more machine-readable storage media comprising a plurality of instructions stored thereon that, after being prepared for execution, cause a compute device that executes the prepared instructions to determine whether a section of an application to be executed by the device is available to be offloaded; determine one or more characteristics of an edge resource available to execute the section; determine, as a function of the one or more characteristics and a target performance objective associated with the section, whether to offload the section to the edge resource; and offload, in response to a determination to offload the section, the section to the edge resource.

What is claimed is:

1. A device comprising:
   at least one memory;
   instructions; and
   processor circuitry to execute the instructions to:

determine whether a section of an application to be executed locally at the device is available to be offloaded;

determine a first latency of the device in executing the section of the application;

determine a second latency of an edge resource in executing the section of the application, the edge resource external to the device;

determine whether to offload the section of the application to the edge resource based on the first latency and the second latency;

in response to determining that the section of the application should be offloaded to the edge resource, determine whether the edge resource satisfies a security requirement associated with the section of the application;

when the first latency is higher than the second latency and the edge resource satisfies the security requirement, offload the section of the application to the edge resource; and when the first latency is higher than the second latency and the edge resource does not satisfy the security requirement, execute the section of the application locally.

2. The device of claim 1, wherein the processor circuitry is to determine whether the section of the application is available to be offloaded by determining whether the section is partitioned from a remainder of the application as a separate set of object code.

3. The device of claim 1, wherein the processor circuitry is to determine whether the section of the application is available to be offloaded by determining whether the section is associated with at least one of a first target performance objective to prioritize latency in execution, a second target performance objective to prioritize a monetary cost of execution, or a third target performance objective to prioritize power usage in execution of the section.

4. The device of claim 1, wherein the processor circuitry is to send a request to an edge gateway device to determine one or more edge resources available to execute the section of the application.

5. The device of claim 4, wherein the processor circuitry is to obtain data indicative of an architecture of the one or more edge resources.

6. The device of claim 5, wherein the data is further indicative of at least one of an available field programmable gate array (FPGA) device, an available graphics processing unit (GPU) device, an available visual processing unit (VPU) device, or an available application specific integrated circuit (ASIC).

7. The device of claim 5, wherein the data is further indicative of an instruction set supported by the one or more edge resources.

8. The device of claim 1, wherein the processor circuitry is to determine the second latency by obtaining data indicative of the second latency associated with at least one of the edge resource, data indicative of a cost of utilization of the edge resource, data indicative of a power usage of the edge resource, data indicative of a resiliency of the edge resource, or data indicative of a reliability of the edge resource.

9. The device of claim 1, wherein the processor circuitry is to determine whether to offload the section to the edge resource by determining whether the edge resource is capable of executing the section at a lower monetary cost than the device.

10. The device of claim 1, wherein the processor circuitry is to determine whether to offload the section to the edge resource by determining whether the edge resource is capable of executing the section with a lower power usage than the device.

11. The device of claim 1, wherein the edge resource is one a plurality of edge resources, the processor circuitry to offload the section to the edge resource by transmitting object code defining the section to be executed in parallel by the plurality of edge resources.

12. The device of claim 1, wherein the processor circuitry is to determine whether the edge resource satisfies the security requirement associated with the section by determining whether the edge resource is capable of executing the section in a trusted execution environment.

13. The device of claim 1, wherein to the processor circuitry is to determine whether the edge resource satisfies the security requirement associated with the section by determining whether the edge resource is located in a geographic area that satisfies the security requirement.

14. A method comprising:

determining, by executing an instruction with a processor, whether a first section and a second section of an application to be executed locally by the processor is available to be offloaded;

determining, by executing an instruction with the processor, a first latency of the processor in executing the first section of the application and a second latency of the processor in executing the second section of the application;

determining, by executing an instruction with the processor, a third latency associated with an external edge resource available to execute the first section of the application and a fourth latency associated with the external edge resource available to execute the second section of the application;

determining, by executing an instruction with the processor, whether to offload (a) the first section of the application to the external edge resource based on the first latency and the third latency and (b) the second section of the application to the external edge resource based on the second latency and the fourth latency;

in response to determining that the first and second sections of the application should be offloaded to the external edge resource, determining, by executing an instruction with the processor, whether the external edge resource satisfies (a) a first security metric associated with the first section of the application and (b) a second security metric associated with the second section of the application;

in response to determining that the first latency is higher than the third latency and the external edge resource satisfies the first security metric, offloading, by executing an instruction with the processor, the first section of the application to the external edge resource; and in response to determining that the second latency is higher than the fourth latency and the external edge resource does not satisfy the second security metric, causing, by executing an instruction with the processor, the second section of the application to be executed locally.

15. The method of claim 14, wherein the determining of whether the first section of the application is available to be offloaded includes determining whether the first section is partitioned from a remainder of the application as a separate set of object code.

16. The method of claim 14, wherein the determining of whether the first section of the application is available to be offloaded includes determining whether the first section is associated with a target performance objective to prioritize latency in execution, a second target performance objective to prioritize a monetary cost of execution, or a third target performance objective to prioritize power usage in execution of the first section.

17. The method of claim 14, further including transmitting a request to an edge gateway device to determine one or more external edge resources available to execute at least one of the first section or the second section of the application.

18. A non-transitory machine-readable storage medium comprising instructions which, when executed, cause one or more processors to at least:
   determine whether a section of an application scheduled to be executed locally by the one or more processors is available to be offloaded;
   determine a first latency of the one or more processors in executing the section of the application; determine a second latency associated with a remote edge resource available to execute the section of the application;
   determine whether to offload the section of the application to the remote edge resource based on the first latency and the second latency;
   in response to determining that the section of the application should be offloaded to the remote edge resource, determine whether the remote edge resource satisfies a security requirement associated with the section of the application;
   if the first latency is higher than the second latency and the remote edge resource satisfies the security requirement, offload the section of the application to the remote edge resource; and
   if the first latency is higher than the second latency and the remote edge resource does not satisfy the security requirement, execute the section of the application locally.

19. The non-transitory machine-readable storage medium of claim 18, wherein the instructions, when executed, cause the one or more processors to determine whether the section of the application is available to be offloaded by determining whether the section is partitioned from a remainder of the application as a separate set of object code.

20. The non-transitory machine-readable storage medium of claim 18, wherein the instructions, when executed, cause the one or more processors to determine whether the section of the application is available to be offloaded by determining whether the section is associated with at least one of a first target performance objective to prioritize latency in execution, a second target performance objective to prioritize a monetary cost of execution, or a third target performance objective to prioritize power usage in execution of the section.

21. The non-transitory machine-readable storage medium of claim 18, wherein the instructions, when executed, cause the one or more processors to send a request to an edge gateway device to determine one or more edge resources available to execute the section of the application.

22. The non-transitory machine-readable storage medium of claim 21, wherein the instructions, when executed, cause the one or more processors to obtain data indicative of an architecture of the one or more edge resources.

23. The non-transitory machine-readable storage medium of claim 22, wherein the data is further indicative of at least one of an available field programmable gate array (FPGA) device, an available graphics processing unit (GPU) device, an available visual processing unit (VPU) device, or an available application specific integrated circuit (ASIC).

24. The non-transitory machine-readable storage medium of claim 22, wherein the data is further indicative of an instruction set supported by the one or more edge resources.

25. The non-transitory machine-readable storage medium of claim 18, wherein the instructions, when executed, cause the one or more processors to determine the second latency by obtaining data indicative of the second latency associated with at least one of the remote edge resource, data indicative of a cost of utilization of the remote edge resource, data indicative of a power usage of the remote edge resource, data indicative of a resiliency of the remote edge resource, or data indicative of a reliability of the remote edge resource.

26. The non-transitory machine-readable storage medium of claim 18, wherein the instructions, when executed, cause the one or more processors to determine whether to offload the section to the remote edge resource by determining whether the remote edge resource is capable of executing the section at a lower monetary cost executing locally.

27. The non-transitory machine-readable storage medium of claim 18, wherein the instructions, when executed, cause the one or more processors to determine whether to offload the section to the remote edge resource by determining whether the remote edge resource is capable of executing the section with a lower power usage than executing locally.

28. The non-transitory machine-readable storage medium of claim 18, wherein the remote edge resource is one a plurality of edge resources, the instructions, when executed, to cause the one or more processors to offload the section to the remote edge resource by transmitting object code defining the section to be executed in parallel by the plurality of edge resources.

29. The non-transitory machine-readable storage medium of claim 28, wherein the instructions, when executed, cause the one or more processors to determine whether the remote edge resource satisfies the security requirement associated with the section by determining whether the remote edge resource is capable of executing the section in a trusted execution environment.

30. The non-transitory machine-readable storage medium of claim 28, wherein the instructions, when executed, cause the one or more processors to determine whether the remote edge resource satisfies the security requirement associated with the section by determining whether the remote edge resource is located in a geographic area that satisfies the security requirement.

* * * * *